W. A. SMITH.
ROTARY EXPLOSION ENGINE.
APPLICATION FILED DEC. 24, 1907.
920,678.
Patented May 4, 1909.
8 SHEETS—SHEET 7.
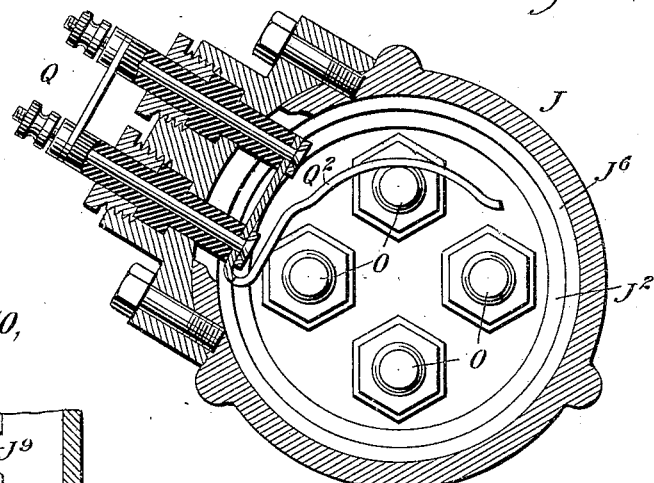
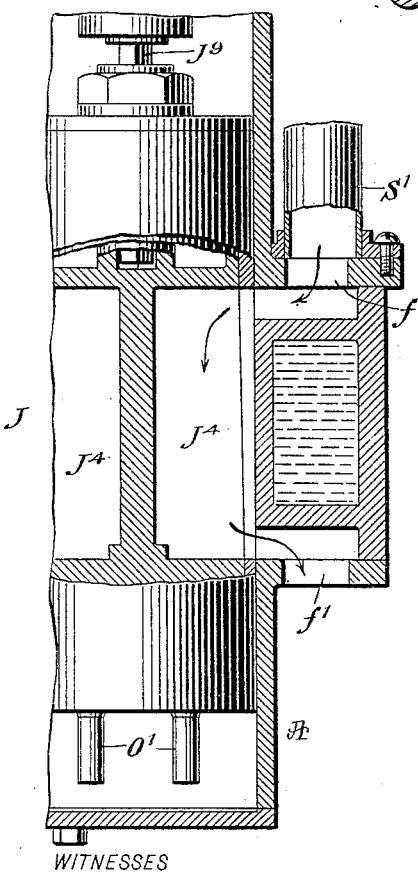
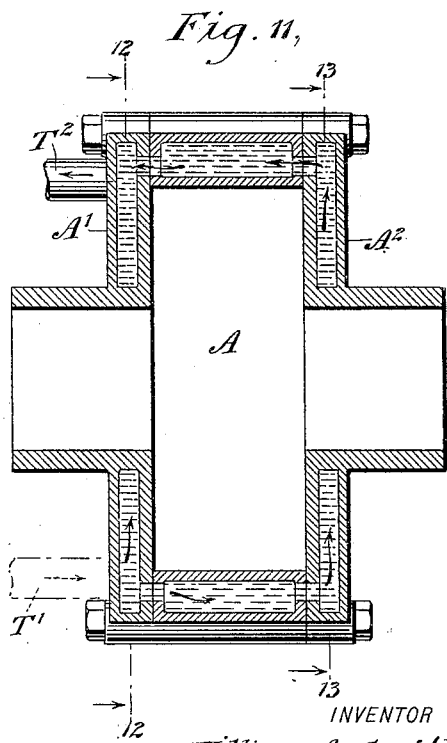
WITNESSES
Edward Thorpe
Rev. G. Hooster
INVENTOR
William A. Smith
BY Munn & Co
ATTORNEYS

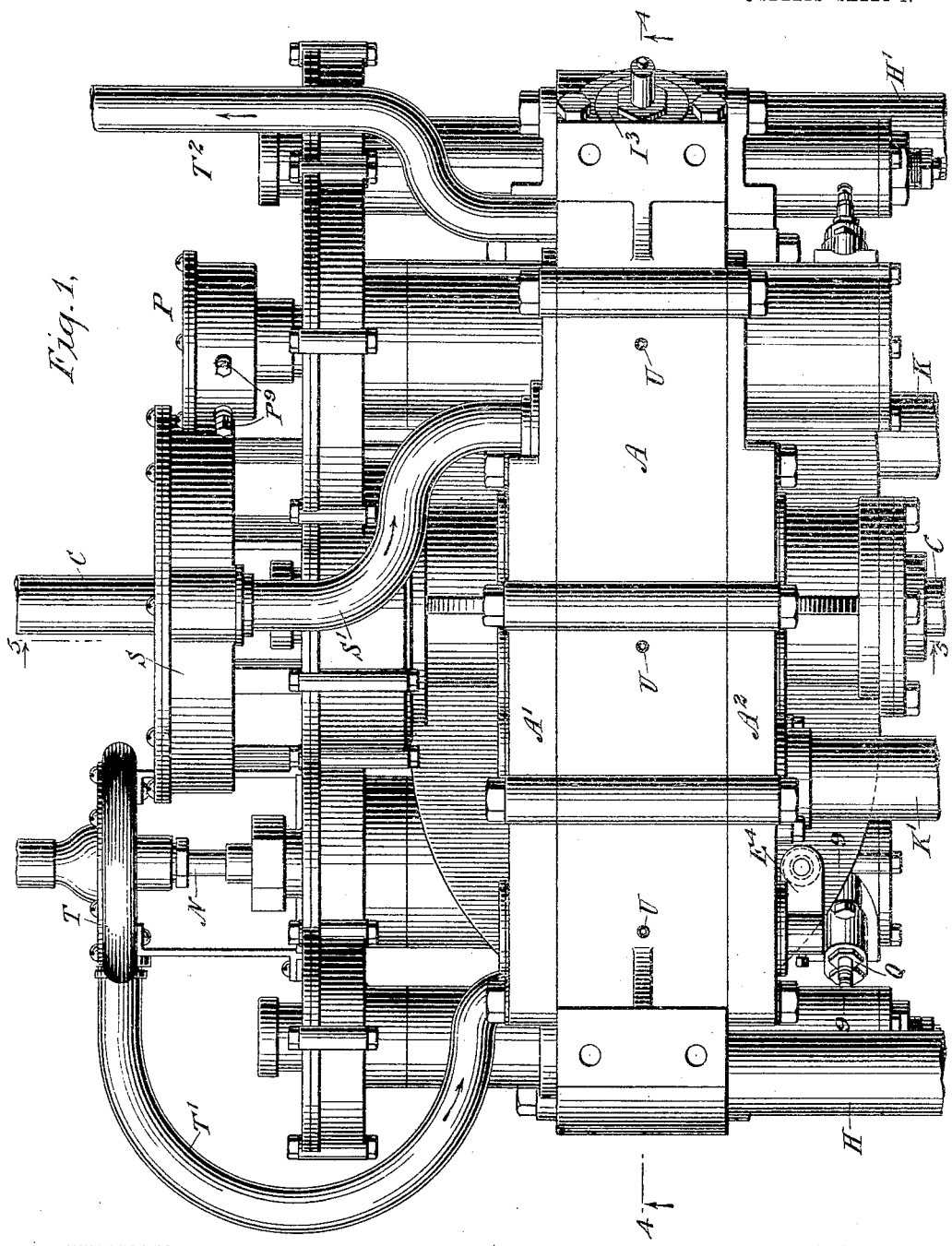

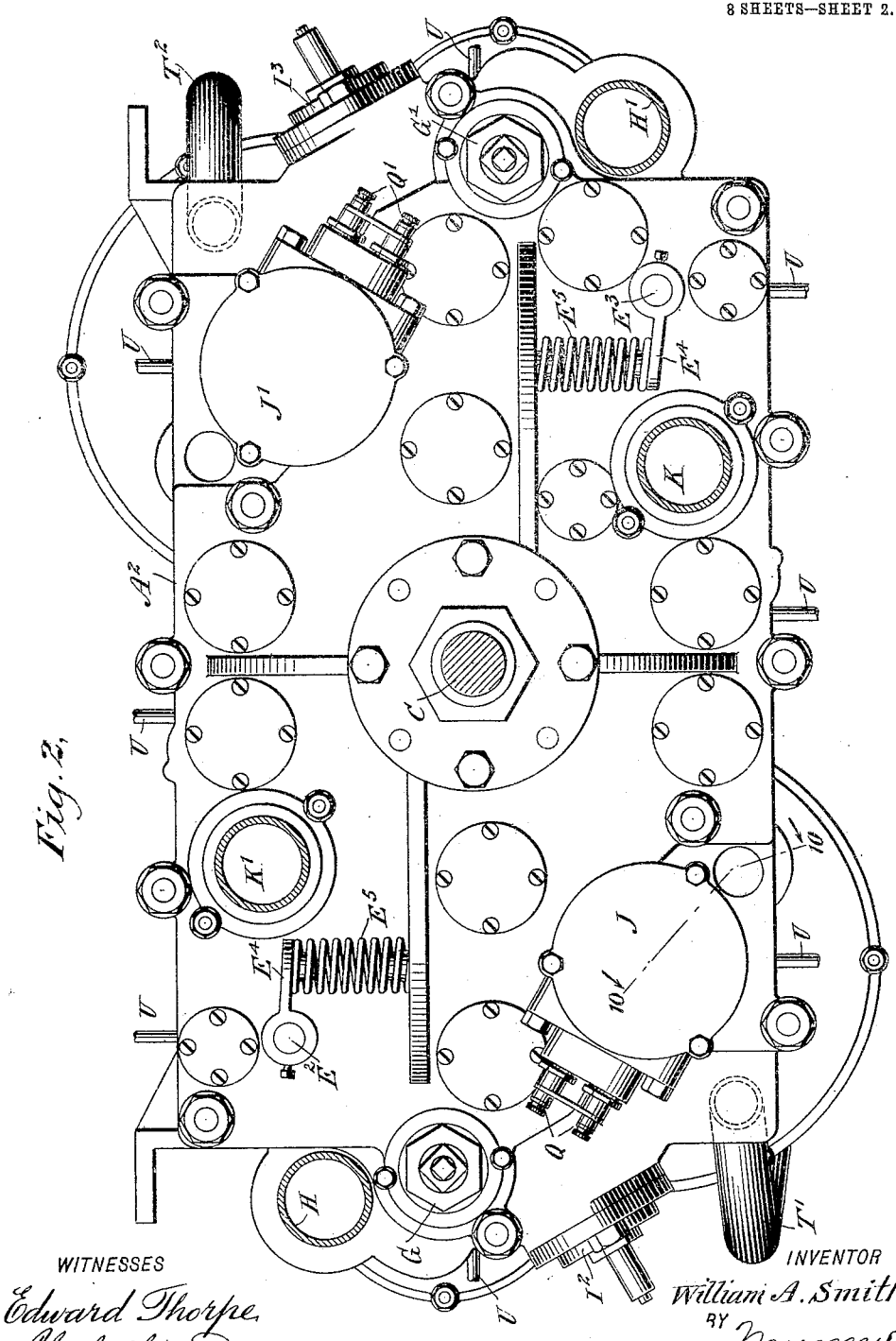

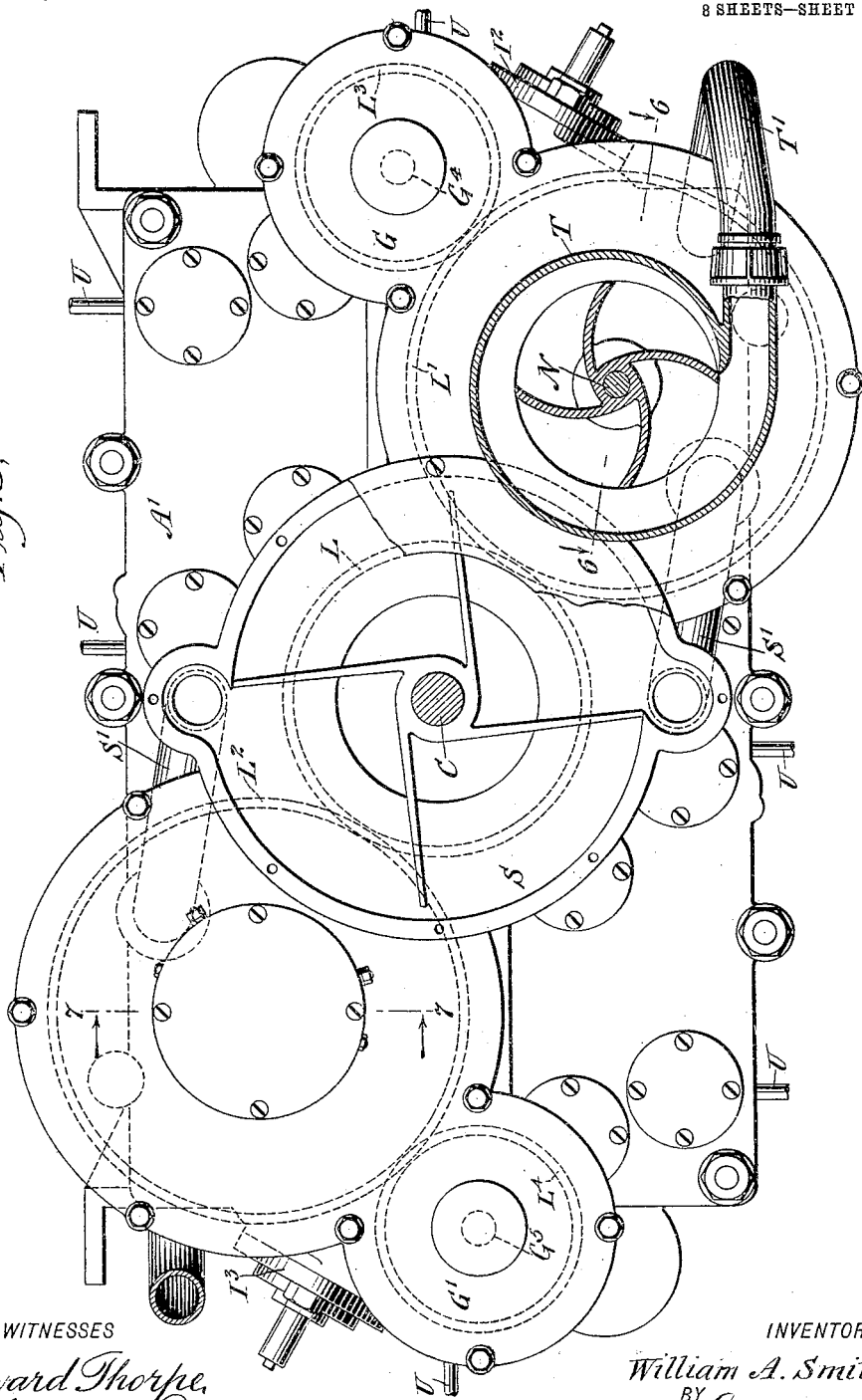

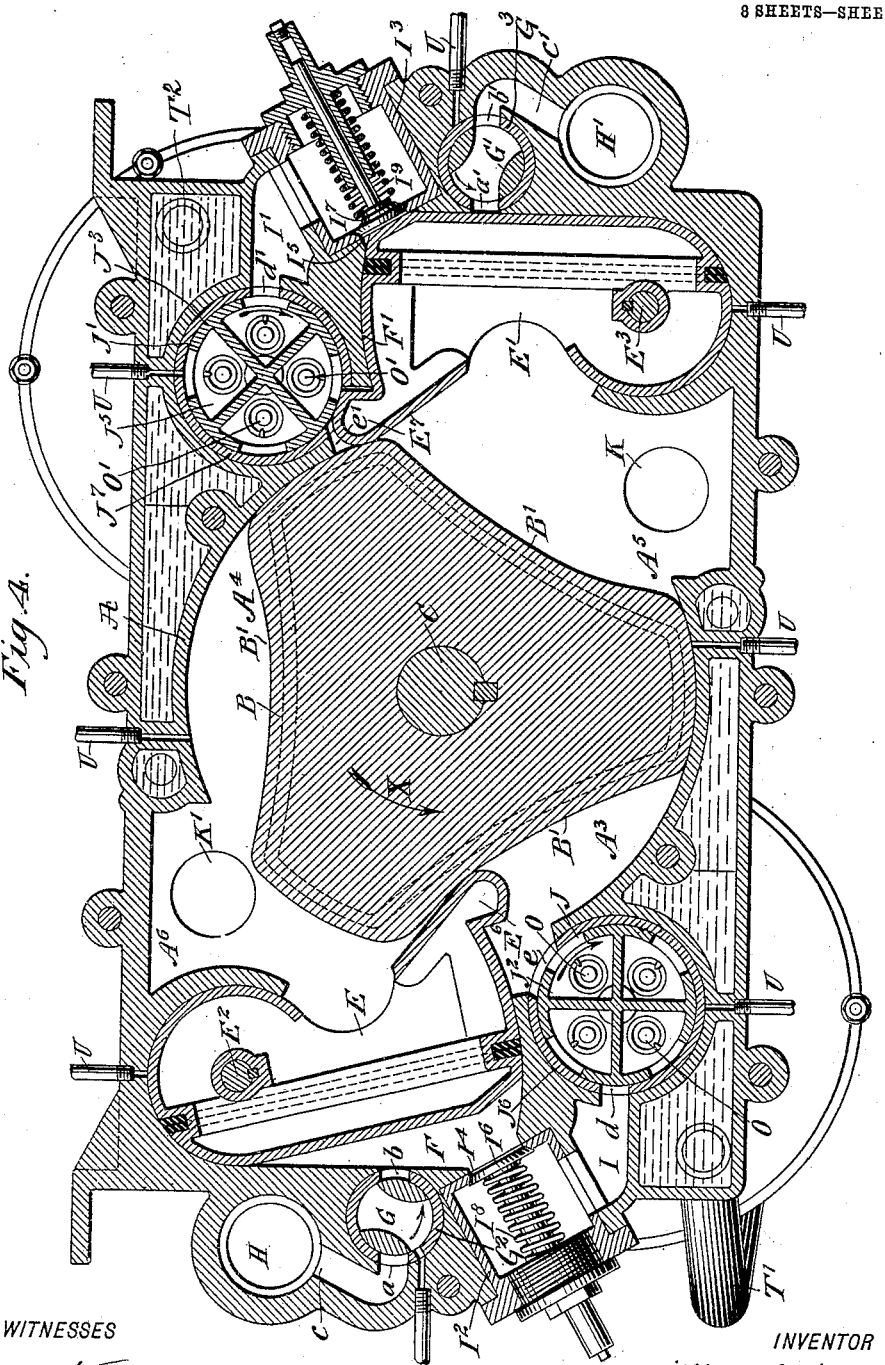

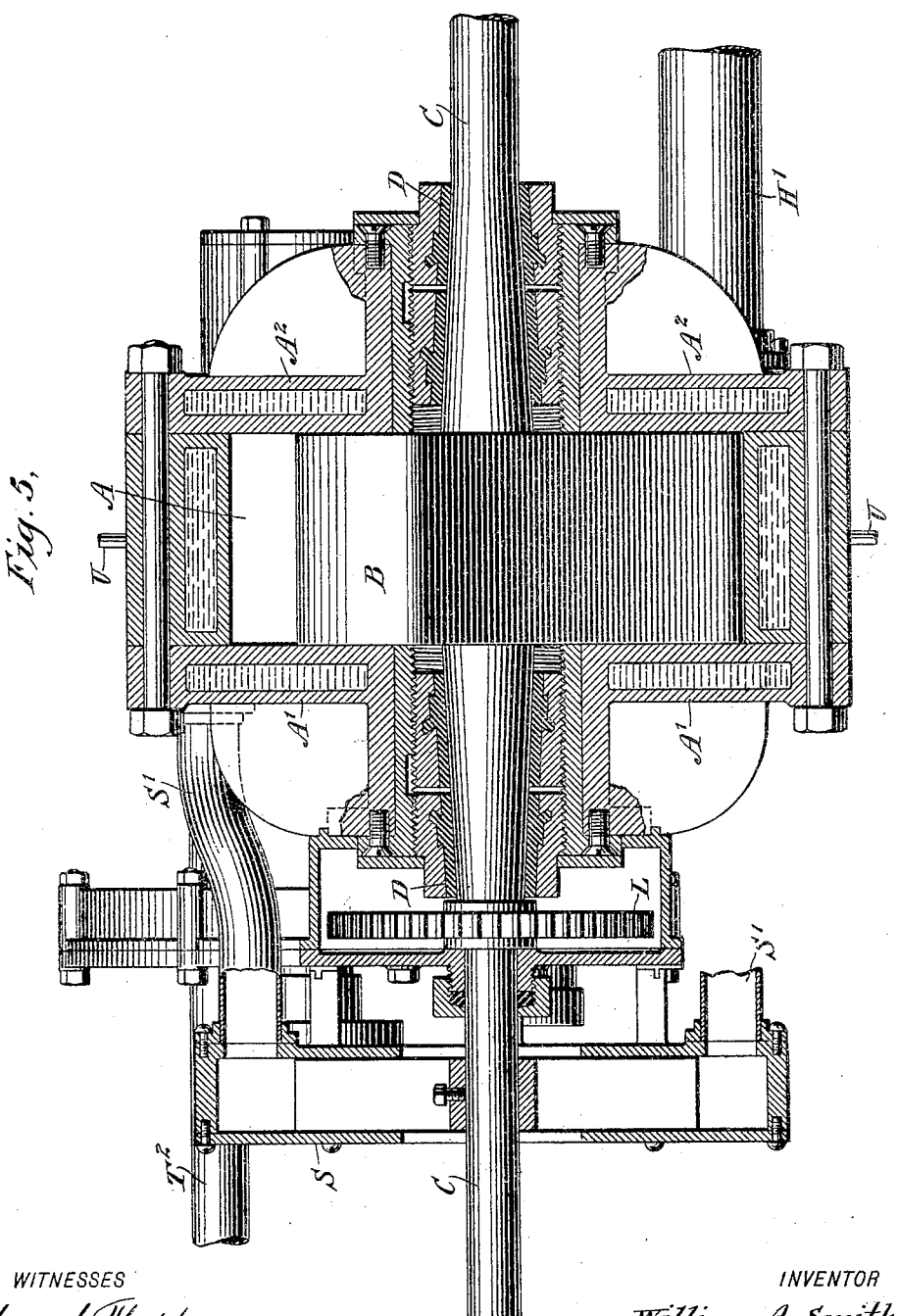

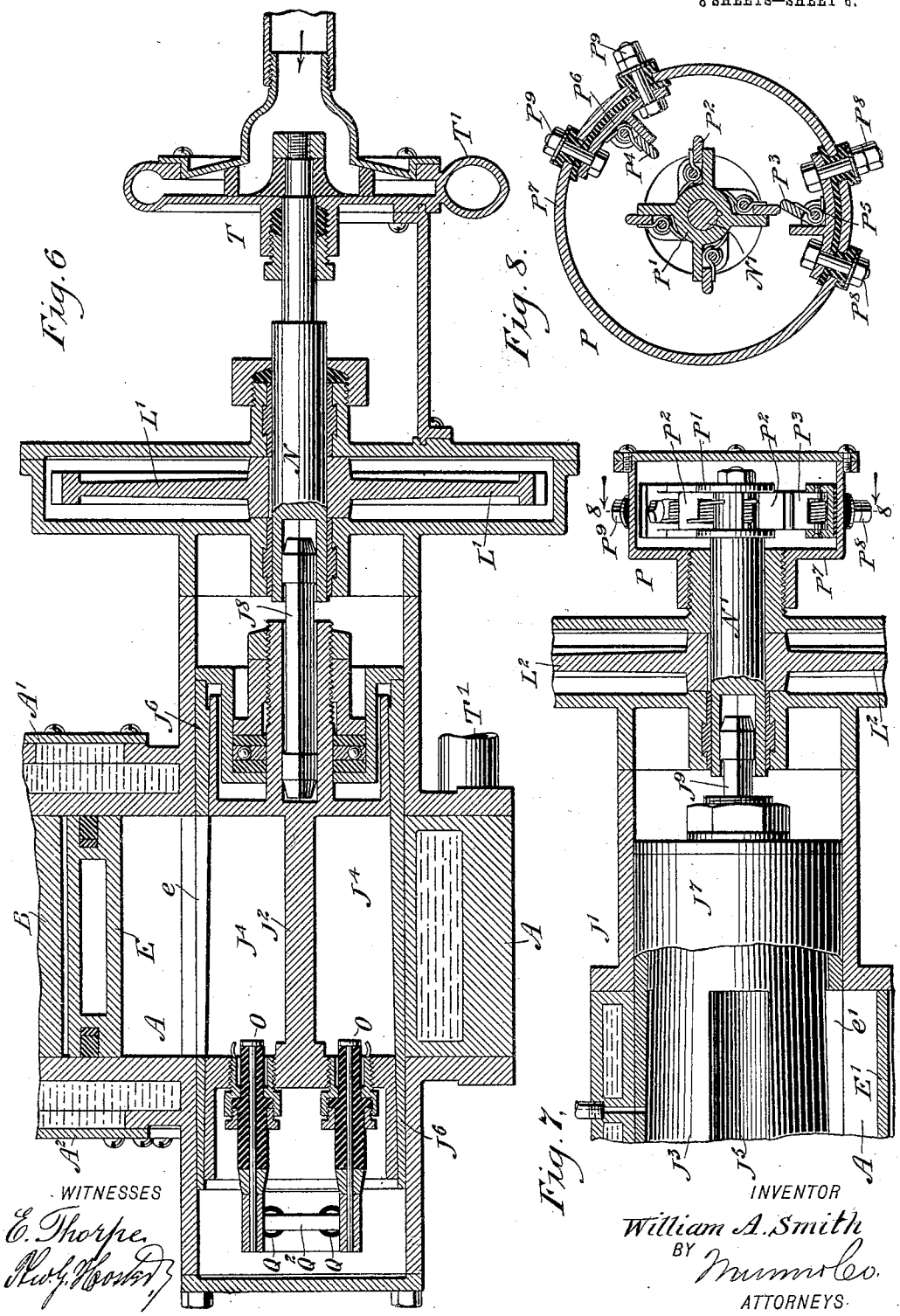

W. A. SMITH.
ROTARY EXPLOSION ENGINE.
APPLICATION FILED DEC. 24, 1907.

920,678.

Patented May 4, 1909.
8 SHEETS—SHEET 8.

WITNESSES
Edward Thorpe,

INVENTOR
William A. Smith
BY Munn & Co.
ATTORNEYS

UNITED STATES PATENT OFFICE.

WILLIAM ARTHUR SMITH, OF LOS ANGELES, CALIFORNIA.

ROTARY EXPLOSION-ENGINE.

No. 920,678.      Specification of Letters Patent.      Patented May 4, 1909.

Application filed December 24, 1907. Serial No. 407,874.

*To all whom it may concern:*

Be it known that I, WILLIAM ARTHUR SMITH, a citizen of the United States, and a resident of Los Angeles, in the county of Los Angeles and State of California, have invented a new and Improved Rotary Explosion-Engine, of which the following is a full, clear, and exact description.

The object of the invention is to provide a new and improved rotary explosion or gas engine, arranged to utilize the force of the explosive mixture to the fullest advantage, by giving a plurality of impulses to the rotor at each revolution thereof, thus insuring an easy and steady running of the engine.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 12:
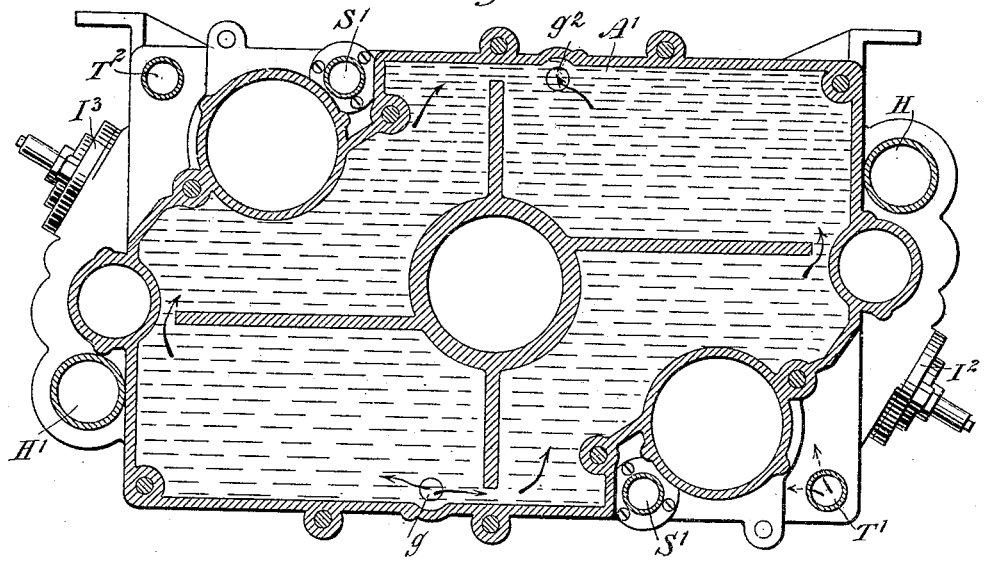
Figure 13:
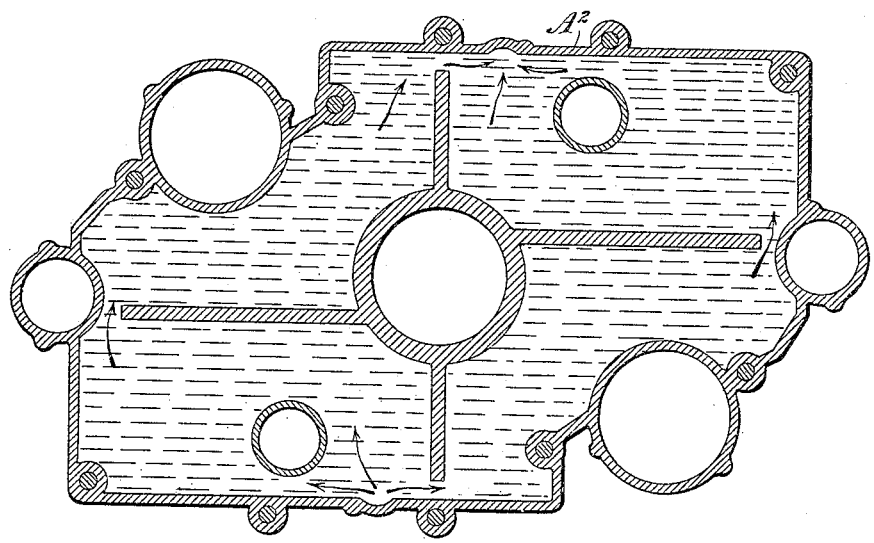

Figure 1 is a plan view of the improvement; Fig. 2 is a rear end elevation of the same; Fig. 3 is a front end elevation of the same, parts being shown in section; Fig. 4 is an enlarged cross section of the improvement on the line 4—4 of Fig. 1; Fig. 5 is an enlarged longitudinal sectional elevation of the same, on the line 5—5 of Fig. 1; Fig. 6 is an enlarged longitudinal section of the ignition and delivery valve provided with a water pump, the section being on the line 6—6 of Fig. 3; Fig. 7 is an enlarged longitudinal sectional elevation of the ignition and delivery valve having a distributer for controlling the ignition, the section being on the line 7—7 of Fig. 3; Fig. 8 is an enlarged cross section of the distributer on the line 8—8 of Fig. 7; Fig. 9 is an enlarged sectional elevation of the contact arrangement for the ignition and delivery valve, the section being on the line 9—9 of Fig. 1; Fig. 10 is an enlarged sectional plan view of one of the ignition and delivery valves, and the means for forcing air through the same for scavenging purposes, the section being on the line 10—10 of Fig. 2; Fig. 11 is a reduced longitudinal sectional elevation of the cylinder and its water jacket; Fig. 12 is a sectional elevation of the water jacket on the line 12—12 of Fig. 11, and Fig. 13 is a like view of the same on the line 13—13 of Fig. 11.

In the cylinder A is mounted to turn the rotor or piston B, having its shaft C journaled in suitable bearings D, arranged in the heads A', A² of the cylinder A, and the peripheral face of the said rotor B is provided with spaced recesses or pockets B', and the said peripheral face is engaged at diametrically opposite points by compression members E, E', movable in compression chambers F, F' receiving the explosive gas by way of the admission valves G, G', from supply pipes H, H' leading to a carbureter or other suitable supply of explosive gas. The compression chambers F, F' connect with valved storage chambers I, I', for storing the compressed explosive gas, which is transferred by transferring devices J, J' in proper charges to the interior of the cylinder A, to be exploded therein, as hereinafter more fully described, to cause the rotor B to rotate in the direction of the arrow $x$, as indicated in Fig. 4. The compression members E and E', form with the recesses B' of the rotor B working chambers A³, A⁴ in the cylinder A, and the said working chambers A³ and A⁴ are adapted to be connected by the recesses B' in the rotor B with the exhaust chambers A⁵, A⁶, from which lead exhaust pipes K and K' for carrying off the exhaust gases.

The compression members E and E' are preferably mounted to swing, and for this purpose are secured on transversely-extending shafts E², E³, journaled in suitable bearings, arranged in the heads A', A² of the cylinder A. One outer end of each shaft E², E³ carries an arm E⁴ (see Fig. 2), pressed on by a spring E⁵, to hold the free end of the compression member E in firm contact with the peripheral surface of the rotor B. Now when the rotor B rotates in the direction of the arrow $x$, then the compression members E and E' are caused to swing inward by the action of their springs E⁵, to draw explosive gas by way of the admission valves G and G' into the compression chambers F, F', and the said compression members E, E' are caused to swing outward by the rotor B against the tension of their springs E⁵, so that the compression member E or E' compresses the previously drawn-in explosive gas, it being understood that at this time the corresponding admission valve G or G' is closed.

The admission valves G and G' are preferably in the form of rotary valves, mounted to turn in valve casings G², G³, having ports $a$, $b$ and $a'$, $b'$, respectively, of which the ports $a$, $a'$ connect by channels $c$, $c'$ with the supply pipes H, H', while the ports $b$, $b'$ open into the compression chambers F, F'. The admission valves G and G' are mounted to rotate in such a manner that they alternately connect their supply pipes with the compression chambers, as will be readily understood by reference to Fig. 4, in which the valve G is shown closed while the valve G' is open.

The storage chambers I and I' are provided with valve casings $I^2$, $I^3$, having valve seats $I^4$, $I^5$, leading to the compression chambers, F, F', and the said valve seats $I^4$ are normally closed by valves $I^6$, $I^7$, normally held to their seats by springs $I^8$, $I^9$, as plainly indicated in Fig. 4. The valves $I^6$, $I^7$ are held to their seats by the springs $I^8$, $I^9$ until the explosive gases in the compression chambers F, F' have been compressed to such a degree that the tension of the springs $I^8$, $I^9$ is overcome, and when this takes place the valves $I^6$, $I^7$ open to permit the compressed explosive gases to pass into the storage chambers I, I'.

The transferring devices J and J' are preferably in the form of revoluble plugs $J^2$, $J^3$, each having a plurality of compartments $J^4$, $J^5$ and mounted to turn in casings $J^6$, $J^7$ provided with ports $d$, $e$ and $d'$, $e'$, respectively, of which the ports $d$, $d'$ connect with the storage chambers I, I', while the ports $e$, $e'$ open into the cylinder A, adjacent to the free ends of the compression members E and E'. The chambers $J^4$, $J^5$ are adapted to register successively with the ports $d$, $e$ and $d'$ $e'$, so that the compressed explosive gas in the storage chambers I and I' successively fills the chambers $J^4$, $J^5$, to be then carried by the said chambers to the ports $e$, $e'$, from which the charges pass into the cylinder A adjacent to the corresponding compression members E and E'. The plugs $J^2$, $J^3$, are arranged in such a manner relative to their ports $d$ and $e$ and $d'$, $e'$, so that when one plug is connected with its storage chamber the other one is disconnected from its storage chamber, as indicated in Fig. 4. In a like manner one plug delivers gas to the cylinder A while the other plug is cut off therefrom.

The plugs $J^2$, $J^3$ and the admission valves G, G' are continuously rotated from the rotor shaft C, and for this purpose the said shaft C is provided with a gear wheel L (see Figs. 3 and 5) in mesh with gear wheels L', $L^2$, secured on auxiliary shafts N, N' engaging the shafts $J^8$, $J^9$ of the plugs $J^2$, $J^3$, and the gear wheels L', $L^2$ are in mesh with gear wheels $L^3$, $L^4$, secured on the shafts $G^4$, $G^5$ of the admission valves G and G'. Thus when the rotor B is turning in the cylinder A, a continuous rotary motion is transmitted by the gear wheels L, L', $L^2$, $L^3$ and $L^4$ to the plugs $J^2$, $J^3$ and the admission valves G, G', to rotate the same simultaneously, with a view to insure a proper admission of the explosive gas to the compression chambers F, F', and to insure a proper transferring of the compressed charges from the storage chambers I, I' into the cylinder A at approximately diametrical points thereof.

Each of the compartments $J^4$, $J^5$, in the revoluble plugs $J^2$, $J^3$, is provided with an electric spark plug O or O' of any approved construction, the several spark plugs being controlled by a distributer P, having a central revoluble contact carrier P' secured on the shaft N', previously mentioned, and shown in Figs. 7 and 8. On the carrier P' are fulcrumed the spring-pressed contacts $P^2$, adapted to alternately engage spring-pressed contacts $P^3$, $P^4$, fulcrumed on plates $P^5$, $P^6$, insulated on the distributer casing $P^7$, and provided with binding posts $P^8$, $P^9$, connected by wires with the binding posts Q, Q', held on the transferring devices J, J'. Each set of binding posts Q, Q' is provided with a spring-contact arm $Q^2$ for engagement with the electrodes of the spark plug O or O', as plainly shown in Fig. 9, so that when the plugs $J^2$, $J^3$ revolve the contact arm $Q^2$ successively makes contact with the spark plugs O and O'. By the arrangement described, a spark is produced in the chamber $J^4$ or $J^5$, whenever such chamber moves in register with the corresponding port $e$ or $e'$, so that the gases passing into the cylinder are burned and the rotor B is turned in the direction of the arrow $x$ by the expanded gases.

In order to clean the compartment $J^4$, $J^5$ of the products of combustion after the chambers have passed the ports $e$, $e'$, the following arrangement is made, special reference being had to Fig. 10. The compartment $J^4$ or $J^5$, after leaving the port $e$ or $e'$, registers at opposite ends with the inlet port $f$ and the exhaust port $f'$, of which the latter port $f'$ leads to the atmosphere while the port $f$ connects with the discharge pipe S' of a rotary blower S of any approved construction, and driven directly from the shaft C (see Fig. 3). Thus when the engine is running, the air drawn in by the blower S is forced by way of the outlet pipes S' and the ports $f$ into the compartments $J^4$, $J^5$, to drive the products of combustion out of these compartments by way of the ports $f'$, so that the said compartments are perfectly clean when next registering with the ports $d$, $d'$ leading to the storage chambers I, I'.

The cylinder heads A', $A^2$ are made hollow, to form water jackets (see Figs. 11, 12 and 13), in communication with water jackets around the cylinder A, as indicated in Figs. 4, 5 and 11. In order to circulate the water through the said connected water jackets, a rotary pump T is employed, driven from the shaft N (see Fig. 3), the outlet pipe T' of the pump being connected with the water jacket in the lower part of the cylinder head A', so that the water flows from the pump T through the pipe T' into the lower right-hand corner of the cylinder A and then flows from right to the left through the water jacket in the lower part of the cylinder A to a point just beyond the center (see Fig. 12) at which point it divides and flows through opposite water ways $g$ and $g$ into the heads A', A². The water again divides in the heads A', A² and flows up through the heads A', A² to and through opposite water ways $g^2$, $g^2$ into the water jacket in the upper part of the cylinder A, in which it flows from the right to the left and passes out through the discharge pipe T² in the upper left-hand corner of the cylinder A.

Lubricants are supplied to the various working parts through oil pipes U, connected with a suitable oil supply.

The operation is as follows: When the several parts are in the position illustrated in Fig. 4, the compression member E is with its free end in contact with a recess B' of the rotor B, thus forming with the rotor a working chamber A³ in the cylinder A. One of the chambers J⁴ in the revoluble plug J is in register with the port $e$, and the charge in this chamber is ignited and the burning gases pass into the working chamber A³, to act on the rotor B and turn the same in the direction of the arrow $x$. The rotation of the rotor B causes an outward swinging of the compression member E, for the latter to compress the gas drawn into the compression chamber F during the previous inward movement of the compression member E. The compressed charge in the compression chamber F now passes by way of the valve I⁶ into the storage chamber I, out of communication at this time with the revoluble plug J² of the transferring device J.

The products of combustion in the working chamber A³ are carried forward in the cylinder A and finally pass into the exhaust chamber A⁵, from which leads the pipe K for carrying off the exhaust gases.

The free end of the compression member E' (as shown in Fig. 4) is in an outermost position, and the admission valve G' is open, so that the rotor B in advancing allows the compression member E' to swing inward, whereby gas is drawn by way of the open admission valve G' into the compression chamber F'. The revolving plug J³ of the transferring device J', now takes a charge of compressed gas from the storage chamber I' and delivers a charge to the port $e'$, and to the working chamber A⁴ in the cylinder as soon as the free end of the compression member E' has passed onto the recess B' of the rotor B, and as this charge is ignited another impulse is given to the rotor B to turn the same in the direction of the arrow $x$.

The products of combustion are carried forward in the cylinder A, to finally pass into the exhaust chamber A⁶, from which the exhaust gases are carried off by way of the exhaust pipe K'.

The products of combustion remaining in a chamber J⁴ or J⁵, after the same has moved out of registry with the corresponding port $e$ or $e'$ are forced out by blasts supplied by the blower S by way of the pipes S' and ports $f$ (see Fig. 10).

By reference to Fig. 4, it will be noticed that the free ends of the compression members E and E' are provided with shoulders or offsets E⁶, E⁷ adapted to pass into the ports $e$, $e'$, respectively, and against which the force of the explosion is first directed to hold the free ends of the compression members E, E' in firm contact with the peripheral face of the rotor B.

Although I have shown the engine provided with two compression chambers, two storage chambers and two transferring devices, it is evident that I do not limit myself to this arrangement, as only one or more such devices may be used by giving any desired number of impulses to the rotor D during each revolution thereof.

Having thus described my invention, I claim as new and desire to secure by Letters Patent:

1. A rotary explosion engine comprising a cylinder, a rotor therein and having recesses in its peripheral face, a compression chamber connected with a gas supply, a valve controlling the admission of gas to said compression chamber, a compressing member in the said compression chamber and forming an abutment operating in conjunction with the said rotor to form with one of the recesses therein a working chamber in the said cylinder, a storage chamber receiving the compressed gas from the said compression chamber, and into which the compression chamber directly opens, a charge transferring device for transferring a charge from the said storage chamber into the cylinder, and an igniting device in the charge transferring device.

2. A rotary explosion engine comprising a cylinder, a rotor therein and having recesses in its peripheral face, a compression chamber connected with a gas supply, a compressing member in the said compression chamber and forming an abutment operating in conjunction with the said rotor to form with one of the recesses therein a working chamber in the said cylinder, a storage chamber receiving the compressed gas from the said compression chamber, a revoluble plug having compartments adapted to register with the said storage chamber and the said cylinder, to transfer an explosive charge from the storage chamber to the said cylinder, and an igniting device in each of the said compartments for igniting the charge therein at the time the compartment is in register with the cylinder.

3. A rotary explosion engine comprising a cylinder, a rotor therein and having recesses in its peripheral face, a compression chamber connected with a gas supply, a compressing member in the said compression chamber and forming an abutment operating in conjunction with the said rotor to form with one of the recesses therein a working chamber in the said cylinder, a storage chamber receiving the compressed gas from the said compression chamber, a revoluble plug having compartments adapted to register with the said storage chamber and the said cylinder, to transfer an explosive charge from the storage chamber to the said cylinder, an igniting device in each of the said compartments for igniting the charge therein at the time the compartment is in register with the cylinder, and means controlled from the rotor and controlling the said igniting devices.

4. A rotary explosion engine comprising a cylinder, a rotor therein and having recesses in its peripheral face, a compression chamber, a compression member movable therein and in contact with the peripheral face of the said rotor, a rotary admission valve for the said compression chamber, a valved storage chamber for receiving the compressed charge from the said compression chamber, a revoluble transferring device having a plurality of compartments adapted to successively register with the said storage chamber and the interior of the said cylinder, means for igniting the delivered charges, and means for rotating the said admission valve from the said rotor.

5. A rotary explosion engine comprising a cylinder, a rotor therein and having recesses in its peripheral face, a compression chamber, a compression member movable therein and in contact with the peripheral face of the said rotor, an admission valve for the said compression chamber, a valved storage chamber for receiving the compressed charge from the said compression chamber, a revoluble transferring device having a plurality of compartments adapted to successively register with the said storage chamber and the interior of the said cylinder, means for igniting the delivered charges contained within the said compartments, and means driven by the said rotor for controlling the ignition of the said igniting means.

6. A rotary explosion engine comprising a cylinder, a rotor therein and having recesses in its peripheral face, a compression chamber, a compression member movable therein and in contact with the peripheral face of the said rotor, an admission valve for the said compression chamber, a valved storage chamber communicating directly with the compression chamber for receiving the compressed charge from the said compression chamber, a revoluble transferring device having a plurality of compartments adapted to successively register with the said storage chamber and the interior of the said cylinder, means for igniting the charge in a compartment at the time the latter is in register with the cylinder, means driven by the rotor for controlling the ignition of the said igniting means, a water jacket for the said cylinder, and a rotary pump on the shaft of the rotor for circulating water through the said water jacket.

7. A rotary explosion engine provided with a cylinder, a rotor therein, a revoluble plug having a plurality of compartments for successively delivering explosive charges to the said cylinder, and means for scavenging a compartment of the products of combustion after the delivery and explosion of the charge.

8. A rotary explosion engine provided with a cylinder, a rotor therein, a revoluble plug having a plurality of compartments for successively delivering explosive charges to the said cylinder, and an air pump driven by the said rotor and having its outlet arranged for register with a compartment after the charge is delivered and ignited.

9. A rotary explosion engine, comprising a cylinder, a rotor therein and having recesses in its peripheral face, a compression chamber connected with a gas supply, a compression member in the said compression chamber and forming an abutment operating in conjunction with the said rotor to form with one of the recesses therein a working chamber in the said cylinder, a storage chamber receiving the compressed gas from the said compression chamber, a charge transferring device adapted to register with the said storage chamber and the said cylinder for transferring a charge from the storage chamber into the cylinder, means for igniting the charge in the charge transferring device at the time the latter is in register with the cylinder, and means for removing the products of combustion from the said charge transferring device.

10. A rotary explosion engine comprising a cylinder, a rotor therein, a compression chamber connected with a gas supply, a compression member movable in the said compression chamber and forming an abutment operating in conjunction with the said rotor to form a working chamber in the said cylinder, a storage chamber receiving the compressed gas from the said compression chamber, a charge transferring device for transferring a charge from the storage chamber into the cylinder, and igniting devices in the charge transferring device for igniting the charge therein at the time the charge transferring device is in register with the cylinder.

11. A rotary explosion engine having a cylinder, a rotor therein, a compression chamber, an admission valve for admitting compression member movable in the said compression chamber and in contact with the rotor to form an abutment for the same, a valved storage chamber into which the compression chamber opens directly, a revoluble charge transferring device for transferring a charge from the storage chamber into the cylinder, and an igniting device for igniting the charge in the said charge transferring device.

12. A rotary explosion engine provided with a cylinder, a rotor therein, a charge transferring device for successively delivering explosive charges to the cylinder, igniting means in the charge transferring device, and means for removing the products of combustion from the charge transferring device.

13. In a rotary explosion engine a cylinder, a rotor therein, a compression chamber connected with a gas supply, a compression member movable in the said compression chamber to compress the charge therein, the said compression member forming an abutment for the rotor, a revoluble plug having a plurality of compartments for successively delivering explosive charges to the cylinder, means for conveying the compressed gas to the said compartments of the plug, and an igniting device in each of said compartments.

14. A rotary explosion engine comprising a cylinder, a rotor therein, a compression chamber connected with a gas supply, a pivoted compression member movable in the said compression chamber and forming an abutment for the rotor, a spring for the said compression member to hold the same in contact with the rotor, a storage chamber for the compressed gas provided with a valve casing having a valve seat opening directly into the compression chamber, a spring pressed valve normally closing said seat, a charge transferring device for transferring a charge from the storage chamber into the cylinder, and an igniting device in the said charge transferring device.

15. A rotary explosion engine having a cylinder, a rotor therein provided with recesses in its peripheral face, a compression chamber connected with a charge supply, a compression member movable in the said compression chamber to compress the charge therein, the said compression member being in peripheral contact with the said rotor to form an abutment for the same, a storage chamber for receiving the compressed charge from the said compression chamber, a valve casing having ports registering with the storage chamber and the interior of the cylinder, a revoluble transferring device mounted to turn in the said casing and adapted to receive the compressed gas from the storage chamber and deliver it to the cylinder, and an igniting device in the said transferring device, the said compression member having its free end provided with an offset adapted to pass into the port of said casing opening into the interior of the cylinder.

16. A rotary explosion engine, comprising a cylinder provided with a water jacket, a rotor in the cylinder, a compression chamber connected with a gas supply, an admission valve for the said compression chamber, a compression member movable in the compression chamber and in contact with the peripheral face of the said rotor, a valved storage chamber for receiving the compressed charge from the compression chamber, a revoluble transferring device having a plurality of compartments adapted to successively register with the said storage chamber and the interior of the cylinder, means for igniting the delivered charges, means for controlling the igniting means, means for removing the products of combustion from the said compartments, and means controlled by the rotor for circulating water through the said water jacket.

17. A rotary explosion engine provided with a cylinder having scavenging passages leading to the atmosphere, a rotor in said cylinder, a storage chamber for the explosive gas, and a revoluble transferring device having a plurality of compartments adapted to successively register with said storage chamber, the interior of the cylinder, and the scavenging passages.

18. A rotary explosion engine provided with a cylinder, a rotor therein, a storage chamber for the explosive gas, a revoluble transferring device having a plurality of compartments for delivering explosive charges from the storage chamber to the interior of the cylinder, an igniting device in each of said compartments, and an air pump for scavenging a compartment after the explosion of a charge, the compartments being adapted to register with the outlet of the air pump and with an exhaust port leading to the atmosphere.

19. In a rotary explosion engine, a cylinder, a rotor, a movable member forming an abutment for the rotor, means for delivering explosive charges to the cylinder and including a casing having a port opening into the cylinder, a transferring device in the said casing, and an igniting device in the transferring device, the said abutment member having its free end provided with an offset adapted to pass into the said port of the casing and against which the force of the explosion is first directed to hold the said member firmly against the periphery of the rotor.

20. In a rotary explosion engine, a cylinder, a rotor therein, a compression chamber connected with a gas supply, a compression member movable in the said compression chamber to compress the gas therein, the said compression member forming an abutment for the rotor, a casing having an inlet port for the compressed gas and an outlet port opening into the interior of the cylinder, a revoluble transferring device mounted to turn in said casing and having a plurality of compartments for successively delivering explosive charges to said cylinder, and an igniting device in each of said compartments, the said compression member having its free end provided with an offset adapted to pass into the port opening into the interior of the cylinder, and against which the force of the explosion is first directed to hold the compression member firmly against the peripheral face of the rotor.

21. A rotary explosion engine comprising a cylinder, a rotor therein, a compression chamber connected with a gas supply, a compression member movable in the said compression chamber and forming an abutment for the rotor, a storage chamber receiving the compressed gas from the compression chamber, a charge transferring device having compartments adapted to register with the storage chamber and the said cylinder to transfer an explosive charge from the storage chamber to the cylinder, means for igniting the delivered charges, a distributer controlled from the rotor and controlling the said igniting means, and means for removing the products of combustion from the charge transferring device.

22. A rotary explosion engine, comprising a cylinder provided with a water jacket, a rotor in the cylinder and having recesses in its peripheral face, the engine having compression chambers connected with a gas supply, admission valves for the said compression chambers, pivoted compression members movable in the compression chambers and forming abutments operating in conjunction with the said rotor to form with the recesses therein working chambers in the cylinder, the engine being provided with exhaust chambers with which the working chambers are adapted to be connected, exhaust pipes leading from the exhaust chambers, storage chambers for receiving the compressed gas from the compression chambers, transferring devices each having a plurality of compartments adapted to successively register with the respective storage chamber and the interior of the cylinder, means for igniting the charges in the charge transferring devices, means for removing the products of combustion from the charge transferring devices, and means for circulating water through the said water jacket.

In testimony whereof I have signed my name to this specification in the presence of two subscribing witnesses.

WILLIAM ARTHUR SMITH.

Witnesses:
   JOHN B. LEE,
   LILLIAN MacEWEN.